(No Model.)
E. N. DICKERSON.
PROCESS OF AND APPARATUS FOR BURNING LIQUEFIED GAS.
No. 555,149.    Patented Feb. 25, 1896.
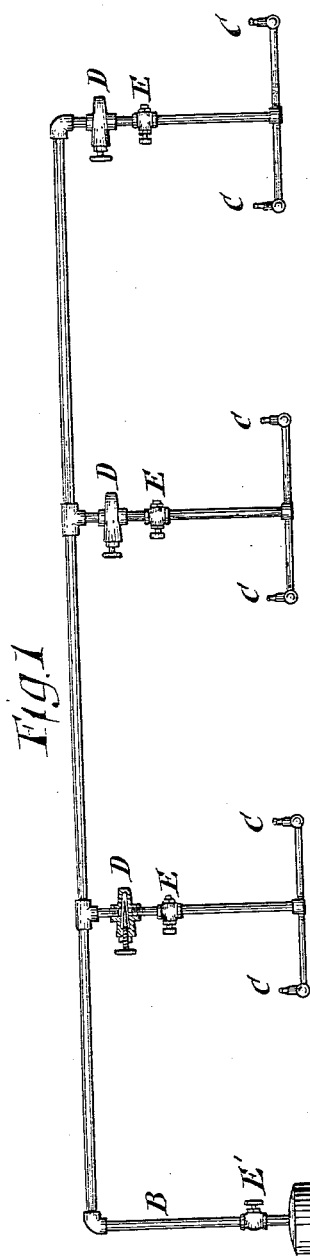
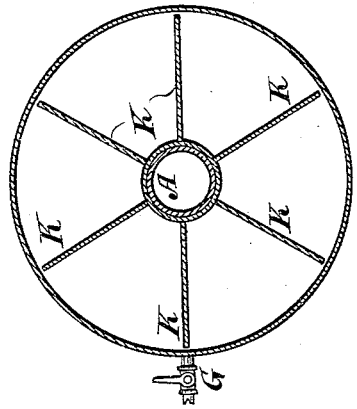
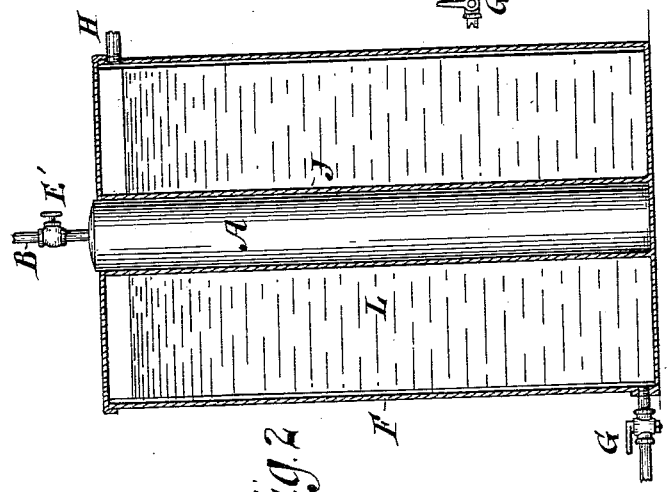
Witnesses
Geo. Wadman
H. Coutant
Inventor
E N Dickerson

United States Patent Office.

EDWARD N. DICKERSON, OF NEW YORK, N. Y.

PROCESS OF AND APPARATUS FOR BURNING LIQUEFIED GAS.

SPECIFICATION forming part of Letters Patent No. 555,149, dated February 25, 1896.

Application filed May 25, 1895. Serial No. 550,668. (No model.)

*To all whom it may concern:*

Be it known that I, EDWARD N. DICKERSON, of the city, county, and State of New York, have invented a new and useful Improvement in Process of and Apparatus for Burning Liquefied Gas, of which the following is a full, true, and exact description, reference being had to the accompanying drawings.

This invention relates to an improvement in a process of and apparatus for burning liquefied illuminating-gas, especially liquefied acetylene; and it consists in maintaining a constant temperature of the liquefied acetylene during the process of combustion, thereby maintaining a constant pressure on the surface of said liquefied acetylene and reducing said pressure at the point of combustion to the desired amount.

The pressure of a liquefied gas does not follow the law of a compressed gas, and it is the utilization of this difference that enables me to maintain a constant pressure at the burner, notwithstanding the variable quantity of liquefied gas in the receiver, provided the temperature of said liquefied gas is maintained practically constant. The withdrawal of the gas from the liquid has, however, the effect of lowering the temperature of the liquid, and a supply of heat must therefore be added to the cooling liquefied gas in order to maintain a constant temperature.

My invention will be readily understood from the accompanying drawings, in which—

Figure 1 represents a diagrammatic elevation of my apparatus; Fig. 2, a vertical cross-section of my heat-restoring device, and Fig. 3 a horizontal cross-section through the same.

A represents a tank containing liquefied acetylene or other liquefied combustible gas.

B represents the delivery-pipe; C, the burners; D, reducing-valves which may be permanently set; E, gas-cocks; F, a water-receptacle through which water may be fed by pipes G H; J, the inner casing of said receptacle arranged to fit closely against the cylinder A; K, radiating-wings.

The vessel A being placed in the casing J is maintained at a practically constant temperature by reason of the heat supplied to it through the surrounding water L. By means of the arrangement shown one cylindrical tank can be readily substituted for another in the chamber F; but, obviously, the tank may be placed directly in the water, if desired, or the tank may be made in the shape shown in Fig. 3 with radiating-wings.

The operation can now be readily understood. Assuming the normal pressure of the tank A at the temperature of the water to be six hundred pounds the valves D are set to reduce the pressure, when the burners C are opened, to the desired amount. These burners are lighted in the usual way by opening the cocks E between them and the burners. A separate reducing-valve D is required for each set of burners, provided that they are not all to be necessarily burned at the same time. A suitable coupling is, of course, provided, which may be in connection with the valve E' for disconnecting the tank A.

The process herein described involves the maintaining of an approximately constant temperature and pressure of the liquefied gas until the whole of such liquefied gas is exhausted. The reason of this is in order that the flame governed by the reducing-valve may be practically constant. This process is therefore radically different from one in which non-liquefied gas exists in a condition of compression in a cylinder, for in that case the pressure reduces immediately as the gas is consumed and there would therefore be no benefit in maintaining a constant temperature. Furthermore, under those conditions there is no appreciable reduction in temperature of the compressed gas in the cylinder. The reduction in temperature in the present process occurs because of the change in the passage of the gas from the liquefied to the gaseous condition, in which change a great number of units of heat become latent.

What I claim as my invention, and desire to secure by Letters Patent, is—

1. The process of gasifying and burning liquefied illuminating-gas, which consists in maintaining the liquid at a substantially constant pressure and temperature notwithstanding its tendency to cool by evaporation, conducting off the gas resulting from evaporation and subsequently reducing the pressure of the gas so conducted off to the desired amount between the source of supply and the burner, and in finally burning said gas, substantially as described.

2. The process of gasifying and burning liquefied acetylene gas, which consists in maintaining the liquid at a substantially constant pressure and temperature notwithstanding its tendency to cool by evaporation, conducting off the gas resulting from evaporation and subsequently reducing the pressure of the gas so conducted off to the desired amount between the source of supply and the burner, and in finally burning said gas, substantially as described.

3. The combination of the tank A containing liquefied combustible gas, the heating device F, the reducing-valve D, and the burner C, substantially as described.

4. The combination of the tank A containing liquefied combustible gas, the heating device F, the reducing-valve D, the valve E', and the burner C, substantially as described.

5. The combination of the water-tank F, the tank A containing liquefied combustible gas, radiating-wings K, the reducing-valve D, and the burner C, substantially as described.

In testimony whereof I have signed my name to this specification in the presence of two subscribing witnesses.

E. N. DICKERSON.

Witnesses:
ANTHONY GREF,
H. COUTANT.